UNITED STATES PATENT OFFICE.

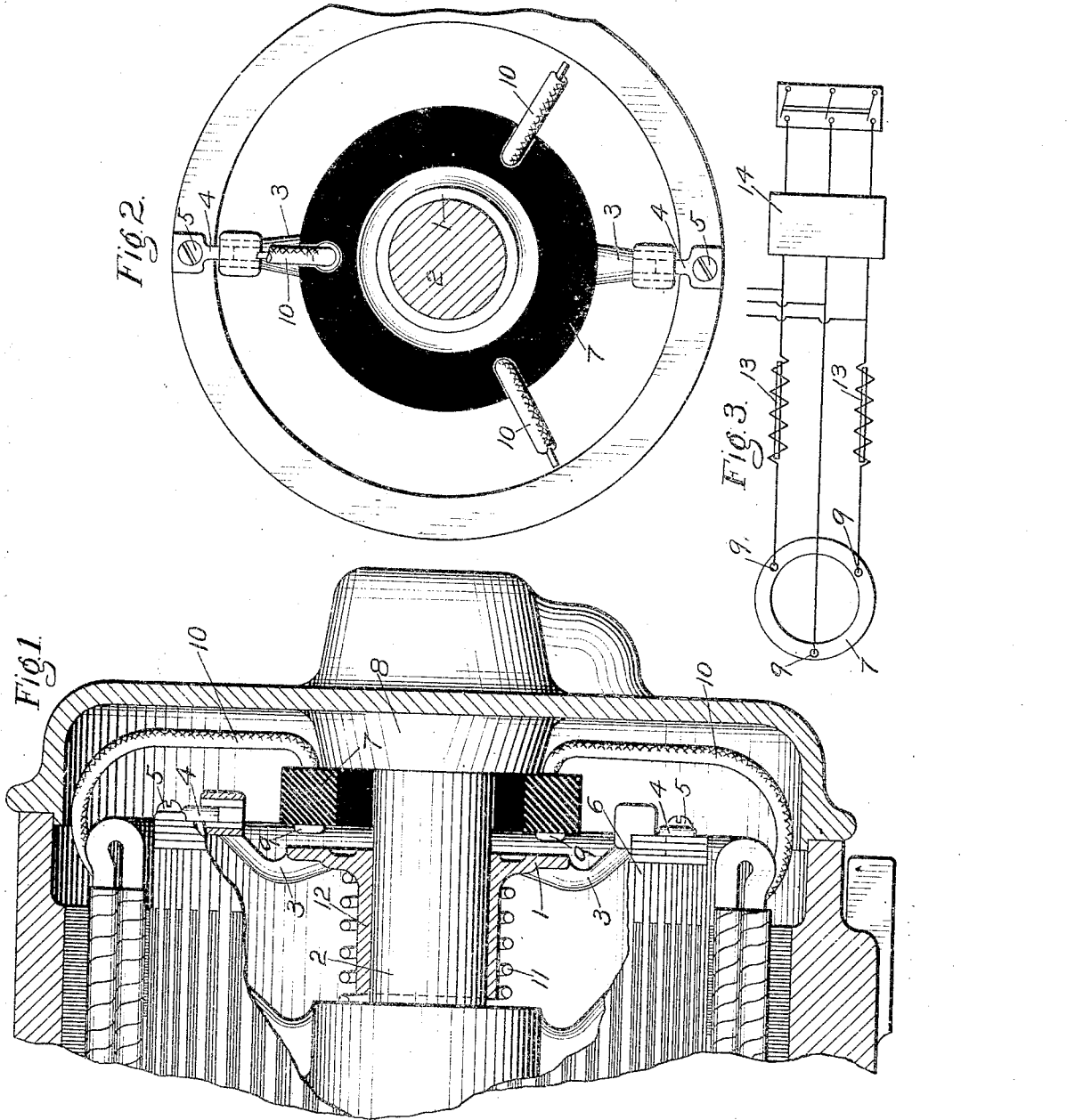

BURTON S. AIKMAN, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

ELECTRICAL PROTECTIVE DEVICE.

1,199,750.  Specification of Letters Patent.  Patented Oct. 3, 1916.

Application filed December 24, 1914. Serial No. 878,963.

*To all whom it may concern:*

Be it known that I, BURTON S. AIKMAN, a citizen of the United States, residing at Milwaukee, in the county of Milwaukee and State of Wisconsin, have invented new and useful Improvements in Electrical Protective Devices, of which the following is a specification.

This invention relates to electrical protective devices, and more particularly to a protective device adapted to prevent burn-outs of electric motor windings.

In order to protect the motor windings, fuses or automatic circuit breakers have heretofore been employed. Where fuses have been used, considerable inconvenience and annoyance is apt to be experienced by the necessity for frequently replacing blown fuses, particularly if the fuse is of such capacity as to give proper protection for the motor windings. This also applies where circuit breakers are employed except that the circuit breaker merely requires resetting after opening.

In order to cut down the frequency of fuse blowing and the opening of the circuit breakers the operator is often liable to substitute fuses of higher capacity or to change the adjustment of the circuit breaker which naturally tends to increase the danger of burn-outs.

The proper fusing and the proper setting of the circuit breaker is particularly difficult where the motor is subjected to heavy momentary loads, or in the case of induction motors where the starting current is many times the normal full load running current.

If the motor is fused or the circuit breakers are adjusted to withstand such abnormal momentary rushes of current, the liability to cause burn-outs of the motor windings is greatly increased and on the other hand, if the motor is fused too low or the circuit breakers are set lower, fuses must be replaced or the circuit breaker reset oftener than is necessary, so far as necessary protection against burn-outs is concerned.

As a matter of fact, the motor windings are not in danger until the temperature has exceeded a certain degree and the principal object of my invention is therefore to provide a device for protecting the motor windings which depends for operation upon the temperature of the motor windings.

In the accompanying drawing; Figure 1 is a central sectional view, in part, of a polyphase motor with my improvement applied thereto; Fig. 2 a transverse section thereof; and Fig. 3 a diagrammatic view showing the wiring connections for a three phase motor protected by a circuit breaker, as employed in connection with my invention.

According to a preferred form of my invention, a movable short circuiting ring 1 is mounted on the rotor shaft 2 and carries radial arms 3 each having a radial aperture within which is mounted the end of a lock 4 adapted to be secured by a screw 5 to the end face of the rotor 6. A stationary ring 7 of insulating material is mounted on the bearing hub 8 of the front motor bracket and is provided with three contact buttons 9, each connected to a phase wire 10, the taps being taken off inside the motor where the line connects to the stator coils.

A coil spring 11 surrounds the hub 12 of the short circuiting ring 1 and tends to move the ring into engagement with the contact buttons 9, but is normally held out of engagement by the locks 4.

The locks 4 are made of a fusible alloy of such strength as to withstand the pressure of the spring 11 under usual motor temperatures, but should the temperature of the motor exceed the predetermined limiting degree, the locks are adapted to soften and permit the movable ring 1 to move forward and engage the contact buttons 9.

In operation, the usual fuses being provided in the three phases, should one of the fuses blow out, if the remaining two fuses are of such capacity as not to blow out upon failure of the motor to start, the temperature of the motor will soon reach the point at which the locks 4 are designed to soften and then the short circuiting ring will be moved out by the spring 11, so as to effect engagement with the contact buttons 9. This action will tie the three phases together, forcing one of the two remaining fuses to blow out, thus stopping the motor and thereby protecting the motor windings. It will be evident that the above action will take place where excessive heating of the motor windings occurs from any other cause as well as the one specifically referred to. In order to resume service, it is only necessary to remove the front motor bracket and apply new locks 4. It will be noted that with this arrangement, the capacity of the phase fuses may be increased to take care of momentary overloads, while providing ample protection against burn-outs.

In some cases, it may be desirable to employ an automatic circuit breaker instead of fuses, as in the case of the larger sized motors and in Fig. 3 of the drawing, I have shown such an arrangement in which a tripping coil 13 is added to each of two phases, and the remaining phase with the ends of the tripping coil phase wires are connected to the contact buttons 9 of the stationary ring 7, the automatic circuit breaker being represented at 14. It will now be evident that when the short circuiting ring 1 is shifted so as to engage the contact buttons 9, a circuit through one or more of the tripping coils 13 is established, and the energization of same will thus effect the tripping of the circuit breaker 14. It will be observed from the wiring connections, that the coils are only in circuit momentarily, so that the possibility of burn-outs is practically eliminated.

This device may be so arranged as to mechanically trip the circuit breaker upon movement of the short-circuiting ring and the construction may obviously be modified in various other ways within the scope of the invention. The invention may also be employed in connection with other types of electric motors.

The temperature at which the locks will release the short-circuiting ring may safely be made slightly higher than the maximum temperature allowed by the motor manufacturer on a full or slight overload, without endangering the motor windings, since the operation is dependent upon the temperature of the windings.

Having now described my invention, what I claim as new and desire to secure by Letters Patent, is:

1. A protective device for electric motors comprising a switch having fixed contacts, a movable contact, and a spring tending to shift said movable contact into engagement with the fixed contacts for closing a circuit adapted to effect the cutting out of the motor, and a fusible element subject to the temperature of the motor windings for normally holding the movable contact out of engagement with the fixed contacts and adapted to fuse when the motor temperature exceeds a predetermined degree and thereby permit the spring to move the movable contact.

2. A protective device for electric motors comprising a stationary ring having contacts connected to the stator windings, a movable short-circuiting ring, a spring tending to move the ring into engagement with the contacts, and fusible elements carried by the rotor for normally holding said ring out of engagement with the contacts.

3. A protective device for three phase motors comprising stationary contacts connected to each phase wire of the motor, a movable short-circuiting ring, a spring tending to move said ring into engagement with the fixed contacts, and fusible elements secured to the rotor and adapted to fuse when the temperature of the rotor windings exceeds a predetermined degree to thereby permit the short-circuiting of the phase windings.

4. A protective device for polyphase motors comprising a stationary ring having a contact connected to each phase of the line, a movable short-circuiting ring mounted on the rotor shaft, a spring tending to shift said ring into engagement with the fixed contacts, and locks of fusible metal secured to the rotor for normally holding the short-circuiting ring out of engagement with the fixed contacts.

In testimony whereof I have hereunto set my hand.

BURTON S. AIKMAN.

Witnesses:
Thos. T. Bours,
Wm. K. Boyle.